United States Patent
Archbold et al.

(10) Patent No.: US 10,402,911 B1
(45) Date of Patent: *Sep. 3, 2019

(54) SYSTEM, METHOD, AND COMPUTER-READABLE MEDIUM FOR REMOVING CREDIT CARD NUMBERS FROM BOTH FIXED AND VARIABLE LENGTH TRANSACTION RECORDS

(71) Applicant: West Corporation, Omaha, NE (US)

(72) Inventors: David Archbold, Omaha, NE (US); Scott D. Westbrook, Omaha, NE (US); James V. Frisbie, Waynesboro, VA (US)

(73) Assignee: West Corporation, Omaha, NE (US)

( * ) Notice: Subject to any disclaimer, the term of this patent is extended or adjusted under 35 U.S.C. 154(b) by 373 days.

This patent is subject to a terminal disclaimer.

(21) Appl. No.: 15/091,015

(22) Filed: Apr. 5, 2016

Related U.S. Application Data

(63) Continuation of application No. 11/762,859, filed on Jun. 14, 2007, now Pat. No. 9,305,042.

(51) Int. Cl.
*G06F 17/30* (2006.01)
*G06Q 40/00* (2012.01)
*G06F 17/27* (2006.01)
*G06F 16/245* (2019.01)

(52) U.S. Cl.
CPC .......... *G06Q 40/12* (2013.12); *G06F 16/245* (2019.01); *G06F 17/2705* (2013.01)

(58) Field of Classification Search
CPC .......... G06F 17/3033; G06F 17/30949; G06F 17/30539; G06F 17/30303; G06F 17/30424; G06F 17/2705; G06F 16/245; G06Q 40/12

USPC .......... 707/749, 750, E17.006, 104
See application file for complete search history.

(56) References Cited

U.S. PATENT DOCUMENTS

| | | | | |
|---|---|---|---|---|
| 5,396,595 | A * | 3/1995 | Standley | H03M 7/42 341/106 |
| 5,943,424 | A * | 8/1999 | Berger | G06Q 20/027 380/29 |
| 7,096,212 | B2 * | 8/2006 | Tribble | G06F 19/3456 |
| 2003/0051054 | A1 * | 3/2003 | Redlich | G06F 21/6209 709/246 |
| 2003/0140007 | A1 * | 7/2003 | Kramer | G06Q 20/04 705/40 |

(Continued)

*Primary Examiner* — Shiow-Jy Fan
(74) *Attorney, Agent, or Firm* — Raffi Gostanian

(57) ABSTRACT

A system, method, and computer readable medium for removing credit card numbers from a financial transaction record is provided. A temporary record containing only numeric characters is generated by parsing non-numeric characters from the financial transaction record. Numeric strings are then parsed from the temporary record and evaluated to determine if the parsed numeric strings potentially comprise a credit card number. Numeric strings that are evaluated as potentially comprising credit card numbers may then be further evaluated to determine if the numeric strings comprise valid credit card numbers. The original financial transaction record may then be searched for numeric strings evaluated as valid credit card numbers. Any string of consecutive characters that match a validated credit card number may then be replaced with white space characters or other innocuous characters in the transaction record.

18 Claims, 6 Drawing Sheets

(56) References Cited

U.S. PATENT DOCUMENTS

| | | | |
|---|---|---|---|
| 2003/0154387 A1* | 8/2003 | Evans | G06F 21/10 713/193 |
| 2003/0200182 A1* | 10/2003 | Truitt | G06Q 20/16 705/75 |
| 2003/0217014 A1* | 11/2003 | Mollett | G06Q 20/401 705/75 |
| 2005/0154578 A1* | 7/2005 | Tong | G06F 17/218 704/5 |

* cited by examiner

300

310 ⤸  312 ⤸  314 ⤸  316 ⤸ 318 ⤸ 320 ⤸    322 ⤸   324 ⤸ 326 ⤸
2007060112345,Abby,Anderson,Omaha,NE,68128,4311111111111119,V,0807

370, 372, 374, 376, 378, 380, 382, 384, 386
2007060112345,Abby,Anderson,Omaha,NE,68128,***************,V,0807

Figure 3D

SYSTEM, METHOD, AND COMPUTER-READABLE MEDIUM FOR REMOVING CREDIT CARD NUMBERS FROM BOTH FIXED AND VARIABLE LENGTH TRANSACTION RECORDS

CROSS-REFERENCE TO RELATED APPLICATIONS

This application is a continuation from U.S. patent application Ser. No. 11/762,859, filed Jun. 14, 2007, entitled "SYSTEM, METHOD, AND COMPUTER-READABLE MEDIUM FOR REMOVING CREDIT CARD NUMBERS FROM BOTH FIXED AND VARIABLE LENGTH TRANSACTION RECORDS", the entire contents of which is incorporated by reference herein in its entirety.

FIELD OF THE INVENTION

The present invention is generally related to call center technologies and, more particularly, to mechanisms for cleansing sensitive financial information from both fixed and variable length transaction records.

BACKGROUND OF THE INVENTION

Call centers are used by many industries to provide information by voice communication to a large number of customers or other interested parties. Telemarketing companies, for example, use call centers to process both inbound and outbound calls, mostly concerning offers of goods and services, but also to provide other information for company clients. Banks and financial institutions also use call centers, as do manufacturing companies, travel companies (e.g., airlines, auto rental companies, etc.), and virtually any other business having the need to contact a large number of customers, or to provide a contact point for those customers.

Call centers provide an effective mechanism for remote commerce, that is commerce wherein the person making the sale or taking the sales data is not in the physical presence of the potential purchaser or customer. In general operation, a prospective purchaser typically calls a telephone number, such as an 800 number. The number dialed is determined by the carrier as being associated with the call center, and the call is delivered thereto. A typical call center will have a front end with one or more voice response units (VRUs), call switching equipment, an automatic call distributor (ACD), and several work stations having a telephone and computer terminal at which a live operator processes the call. The dialed number is typically taken automatically from the carrier (long distance) through use of the dialed number identification service (DNIS) and is utilized to effect a database access resulting in a "screen pop" of a script on the operator's computer terminal. In this way, when a prospective purchaser calls a given telephone number, a telemarketing operator may immediately respond with a script keyed to the goods or services offered. The response may be at various levels of specificity, ranging from a proffer of a single product, e.g., a particular audio recording, or may be for various categories of goods or services, e.g., where the dialed number is responded to on behalf of an entire supplier. In this manner, a call center may provide retail commerce on behalf of various merchants.

Most often, goods or services purchased through a call center are made via credit card transactions. Thus, a call center may have records of transactions associated with any number of merchants. As such, a call center record keeping service may be targeted for malicious access of financial information, such as credit card numbers. It is often desirable to maintain financial records associated with credit card transactions in either a fixed field or a delimiter separated value file. Because different merchants may require different information for effecting a transaction, records maintained by a call center may be of both fixed and variable length and may have different fields or data elements than other transaction records. Such heterogeneous records maintained in a common file or storage system may not present an effective mechanism for removing sensitive financial information, e.g., in the event that a particular field containing credit card numbers is not commonly shared by all financial transaction records.

Therefore, what is needed is a mechanism that overcomes the described problems and limitations.

SUMMARY OF THE INVENTION

The present invention provides a system, method, and computer readable medium for removing credit card numbers from financial transaction records. A temporary record containing only numeric characters may be generated from a transaction record by parsing non-numeric characters from the transaction record. Numeric strings are then parsed from the temporary record and evaluated to determine if the parsed numeric strings potentially comprise a credit card number, for example by a LUHN Mod 10 evaluation. Numeric strings that pass the LUHN Mod 10 evaluation may then be further evaluated to determine if the numeric strings comprise valid credit card numbers. The original financial transaction record may then be searched for numeric strings evaluated as valid credit card numbers. Any string of consecutive characters that matches a validated credit card number may then be replaced with white space characters or other innocuous characters in the transaction record.

In one embodiment of the disclosure, a method for processing transaction records is provided. The method includes reading a first transaction record comprising alphabetic and numeric characters, generating a second record comprising only the numeric characters by parsing the alphabetic characters from the first record, sequentially parsing N consecutive numeric characters from the second record with each sequentially parsing step offset by one numeric character from a previous parsing step such that each possible sequence of N consecutive numeric characters are parsed from the second record, evaluating each sequence of N consecutive numeric characters to determine if the respective sequence comprises a valid credit card number, and searching the first transaction record for any sequence evaluated as a valid credit card number.

In another embodiment of the disclosure, a computer-readable medium having computer-executable instructions for execution by a processing system, the computer-executable instructions for processing transaction records is provided. The computer-readable medium comprises instructions for reading a first transaction record comprising alphabetic and numeric characters, generating a second record comprising only the numeric characters by parsing the alphabetic characters from the first record, sequentially parsing N consecutive numeric characters from the second record with each sequentially parsing step offset by one numeric character from a previous parsing step such that each possible sequence of N consecutive numeric characters are parsed from the second record, evaluating each sequence of N consecutive numeric characters to determine if the respective sequence comprises a valid credit card number, and searching the first transaction record for any sequence evaluated as a valid credit card number.

In a further embodiment of the disclosure, a system for processing transaction records is provided. The system comprises a processing unit, and a memory communicatively coupled with the processing unit and storing computer-executable instructions for execution by the processing unit, the computer-executable instructions specifying logic for reading a first transaction record comprising alphabetic and numeric characters, generating a second record comprising only the numeric characters by parsing the alphabetic characters from the first record, sequentially parsing N consecutive numeric characters from the second record with each sequentially parsing step offset by one numeric character from a previous parsing step such that each possible sequence of N consecutive numeric characters are parsed from the second record, evaluating each sequence of N consecutive numeric characters to determine if the respective sequence comprises a valid credit card number, and searching the first transaction record for any sequence evaluated as a valid credit card number.

BRIEF DESCRIPTION OF THE DRAWINGS

Aspects of the present disclosure are best understood from the following detailed description when read with the accompanying figures, in which:

FIG. 3A is a diagrammatic representation of an exemplary transaction record that may be processed to facilitate enhanced financial transaction security in accordance with an embodiment;

FIG. 3B is a diagrammatic representation of a temporary record generated from a financial transaction record in accordance with an embodiment;

FIG. 3C is a diagrammatic representation of character strings each comprising a sequence of consecutive characters that may be parsed from a temporary record and evaluated in accordance with an embodiment;

FIG. 3D is a diagrammatic representation of a scrubbed transaction record implemented in accordance with an embodiment of the invention;

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
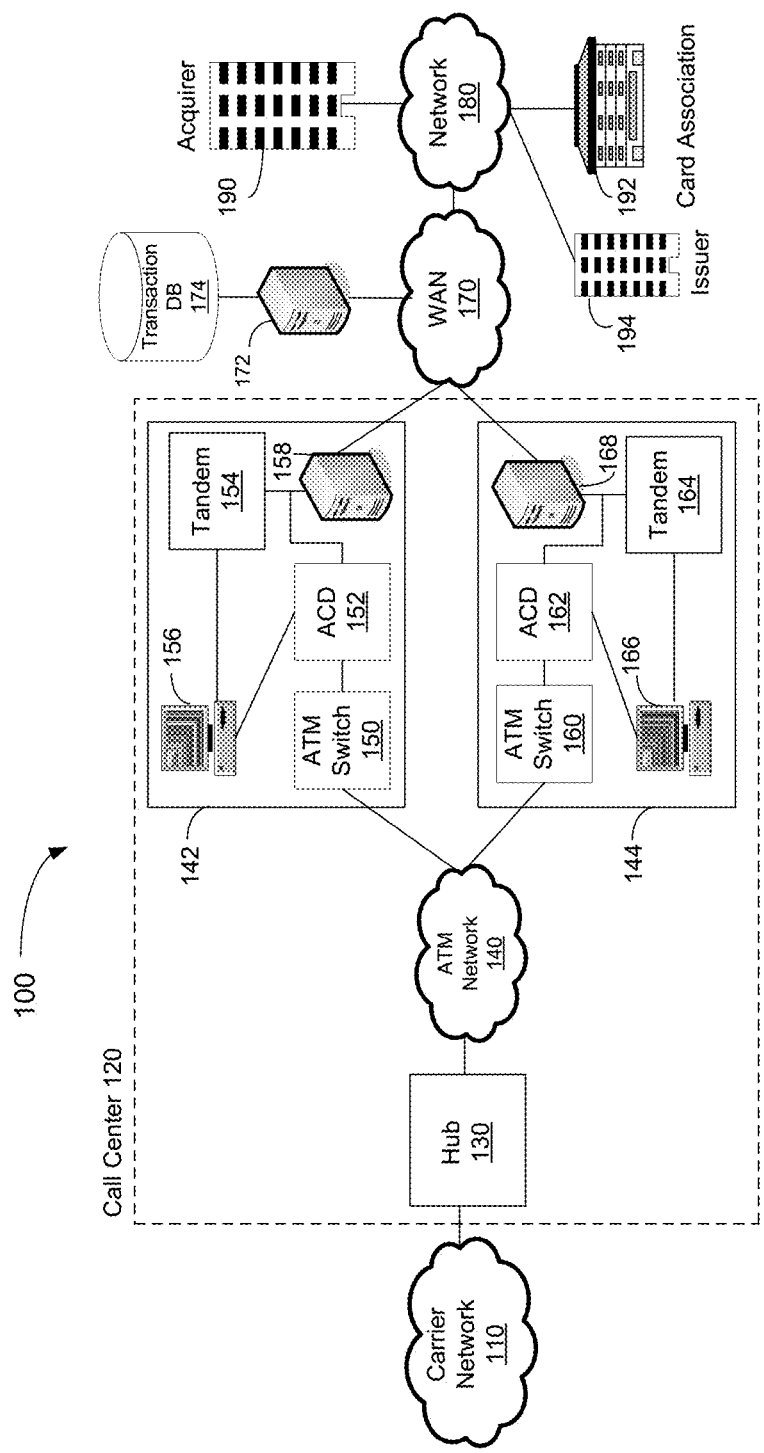
FIG. 1 is a diagrammatic representation of a system that facilitates processing of credit card transactions in accordance with an embodiment of the invention.

Now referring to FIG. 1, a system 100 that facilitates processing of credit card transactions in accordance with an embodiment of the invention is depicted. In the depicted system configuration, a call is delivered to a hub 130 of a call center 120 by a carrier network 110. The call may be received by a voice response unit (VRU) deployed at hub 130, and numerous VRUs may be deployed in hub 130. Voice response units are known in the art, and the details of the operation of the VRU will not be explained herein. Briefly, the VRU is a telecommunications computer, also called an Interactive Voice Response (IVR) unit, that responds to caller entered touch-tone digits and/or to the caller's voice in much the same way that a conventional computer responds to keystrokes or mouse clicks. The VRU may play digitally recorded speech that provides menu selections to the caller. The caller then enters the touch-tone digits that correspond to the desired menu selection or provides a voice response. The caller entered digits or voice commands can invoke options as varied as looking up account balances, moving the call within or to another system component, obtaining preliminary information from a caller, or playing a pre-recorded announcement for the caller. In a typical call center, the function of the VRU is to obtain preliminary call information, such as the caller's identity, customer information, preliminary transaction data, or the like.

When the call is delivered by the carrier, the dialed number is available through the carrier's Dialed Number Information Service (DNIS), and the calling telephone number is available by use of Automatic Number Identification (ANI). Automated or semi-automated intelligent call processing may be made available by either or both of the ANI or DNIS provided by the carrier. After the call is processed at the VRU of hub 130, the VRU may create a connection to a switch deployed in hub 130. As part of the process, the VRU assigns an internal DNIS that associates the call with its destination at the proper remote location. The internal DNIS associated with the call by the VRU is used by the system to route the call to its proper destination.

After the call has been processed at the hub VRU, it is connected to a programmable hub switch by, for example, T1 voice trunk lines that in turn may route the call to an ATM switch deployed in hub 130 by way of, for example, T1 voice trunk lines. The ATM switch provides a connection from hub 130 to the connectivity member, e.g., ATM network 140, for transmission of the call to the proper remote location, e.g., remote locations 142 or 144. Two such remote locations 142 and 144 are shown in FIG. 1, and each remote location 142-144 comprises a back-end of the call center where live operators are available to receive and process inbound calls. Each live operator preferably works at a workstation 158 and 168 equipped with a telephone or other call-receiving equipment, as well as a computer connected to a database containing the call center service information. The hub ATM switch may use the internal DNIS associated with the call to route the call to its proper remote location based upon previously defined software control.

ATM Network 140 delivers the call to a remote location, e.g., remote location 142. The remote location 142-144 interfaces with ATM Network 140 and comprises another ATM switch 150 and 160 similar or identical to that provided at the hub. The ATM switch 150 and 160 converts the signal from ATM transmission to, for example, time division multiplexing (TDM) transmission over conventional T1 voice trunk lines, and transfers the call to an Automatic Call Distributor (ACD) 152 and 162. ACD 152 and 162 provides call routing based upon, for example, the availability of operators located at the remote sites or other call-routing decision criteria. Once the call is routed to and received by the operator at the operator workstation, the call is processed in a manner known to those skilled in the art. Additionally, remote locations 142-144 may interface or include a respective server 158 and 168 that couples with a wide area network WAN 170.

In the present example, call center 120 may provide retail services on behalf of one or more merchants and may accept credit card payments for products or services sold to a cardholder. To facilitate processing of credit card transactions, a transaction database 174 may be accessible by call center 120 via a computer system 172 coupled with a communications network, e.g., WAN 170. Computer system 172 may comprise a server that runs a database management system for accessing database 174. Transaction database 174 may store credit card transaction records that specify, for example, customer names, addresses, transaction reference numbers, credit card numbers, and the like. Because call center 120 may service various merchants or business units, different transaction records maintained in transaction database 174 may have different required data sets. To this end, transaction database 174 may comprise a delimiter-separated values (CSV) file with individual transactions stored as separate rows of the CSV file.

Various financial entities may be involved in processing of a credit card transaction. An acquirer 190 comprises a financial institution that provides card processing services to call center 120. A card association 192 comprises a network, such as VISA, that functions as a gateway between acquirer 190 and a card issuer 194. Card association 192 provides purchase authorization and funding of credit card transactions. Issuer 194 comprises an organization that issued the credit card to the cardholder.

A credit card transaction includes an exchange of information and money between the entities and is often referred to as an interchange. In general, the interchange is initiated when a cardholder supplies account information for payment to call center 120 or other merchant that, in turn, submits the transaction information to acquirer 190 for authorization. Acquirer 190 verifies with issuer 194 that the card number and transaction amount are both valid via network 180, and informs call center 120 that the purchase is allowed or disallowed. At this time, issuer 194 may provisionally debit funds from the cardholder's credit account.

Typically, after the transaction is authorized, a transaction record is generated at call center 120 and is stored in a batch, that is a database of numerous such transaction records. Call center 120 may periodically, e.g., once a day, transmit the batch to acquirer 190 to receive payment. A settlement process is then performed by acquirer 190 sending the transactions in the batch through card association 192 that debits the issuers for payment and credits the acquirer. Call center 120 may maintain various transaction records for any number of accounting processes. Disadvantageously, vast amounts of sensitive financial information, e.g., credit card numbers, may remain in transaction database 174 for extended periods of time.

Because of the number of entities involved in a transaction, and the sheer volume of transactions processed on a daily basis, countless opportunities exist in system 100 for fraudulent abuse of financial information involved in the credit card transactions. A common method of fraud is made through stolen credit card information that may be obtained in various ways, e.g., through malicious access of transaction database 174. In many instances, a call center may provide merchant services for any number of retailers, and may thus maintain transaction records for a variety of merchants. Accordingly, a vast amount of consumer information may be maintained by call center 120. As such, it is desirable that sensitive financial information, most particularly credit card numbers, are not maintained at a call center for an extended period after financial transactions have been successfully resolved.

In accordance with an embodiment, mechanisms are provided for evaluating transaction records in transaction database 192. Transactions that have been fully resolved may be subjected to a "scrubbing" routine that identifies credit card numbers, and responsive thereto, replaces the credit card numbers with blank characters, or other innocuous indicia.

Figure 2:
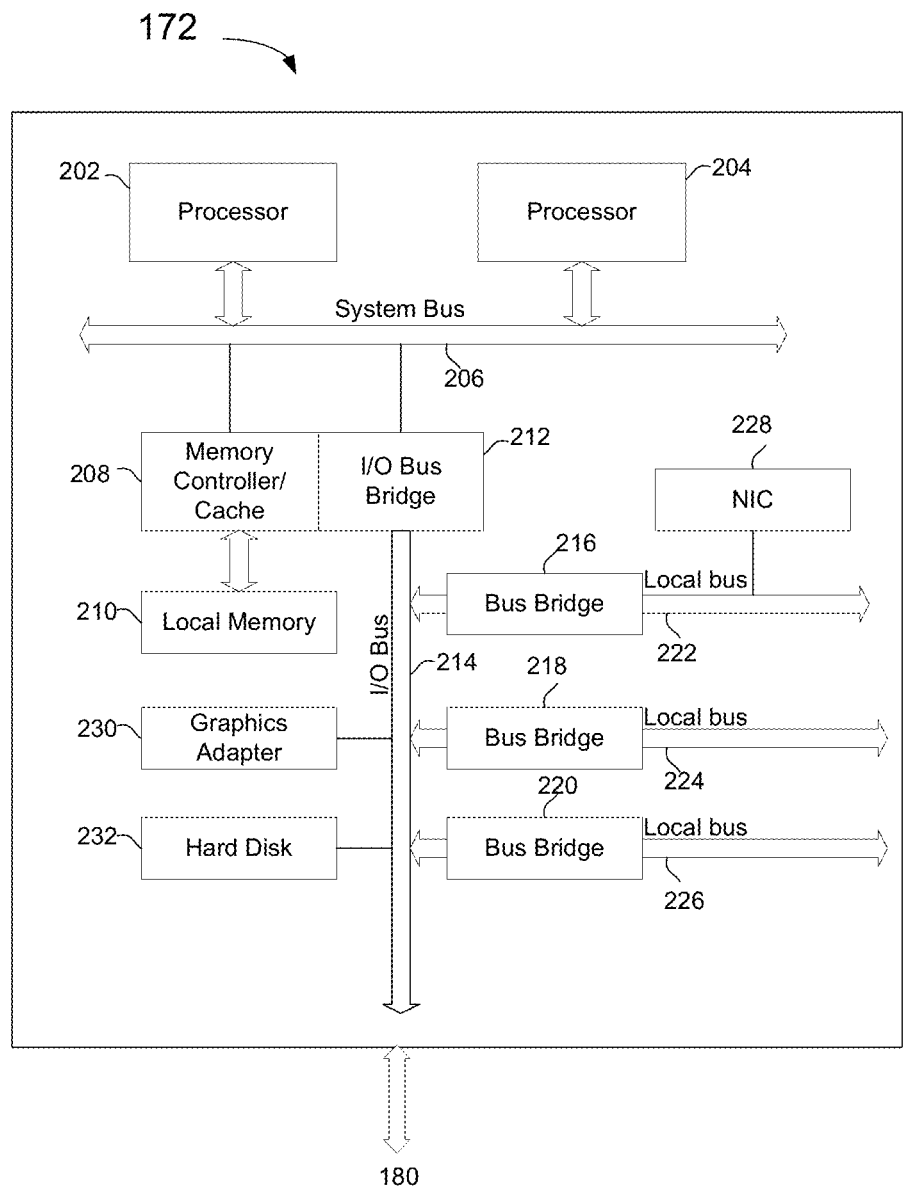
FIG. 2 is a diagrammatic representation of an exemplary embodiment of computer system depicted in FIG. 1.

FIG. 2 is a diagrammatic representation of an exemplary embodiment of computer system 172 depicted in FIG. 1. Code or instructions implementing transaction record scrubbing routines implemented according to embodiments disclosed herein may be located or accessed by computer system 172.

System 172 may be implemented as a symmetric multi-processor (SMP) system that includes a plurality of processors 202 and 204 connected to a system bus 206, although other single-processor or multi-processor configurations may be suitably substituted therefor. A memory controller/cache 208 that provides an interface to local memory 210 may also be connected with system bus 206. An I/O bus bridge 212 may connect with system bus 206 and provide an interface to an I/O bus 214. Memory controller/cache 208 and I/O bus bridge 212 may be integrated into a common component.

A bus bridge 216, such as a Peripheral Component Interconnect (PCI) bus bridge, may connect with I/O bus 214 and provide an interface to a local bus 222, such as a PCI local bus. Communication links to other network nodes of system 100 in FIG. 1 may be provided through a network interface card (NIC) 228 connected to local bus 222 through add-in connectors. Additional bus bridges 218 and 220 may provide interfaces for additional local buses 224 and 226 from which peripheral or expansion devices may be supported. A graphics adapter 230 and hard disk 232 may also be connected to I/O bus 214 as depicted.

An operating system may run on processor system 202 or 204 and may be used to coordinate and provide control of various components within system 172. Instructions for the operating system and applications or programs are located on storage devices, such as hard disk drive 232, and may be loaded into memory 210 for execution by processor system 202 and 204.

Those of ordinary skill in the art will appreciate that the hardware depicted in FIG. 2 may vary. The depicted example is not intended to imply architectural limitations with respect to implementations of the present disclosure, but rather embodiments disclosed herein may be run by any suitable data processing system.

Figures 3A, 3B, 3C:
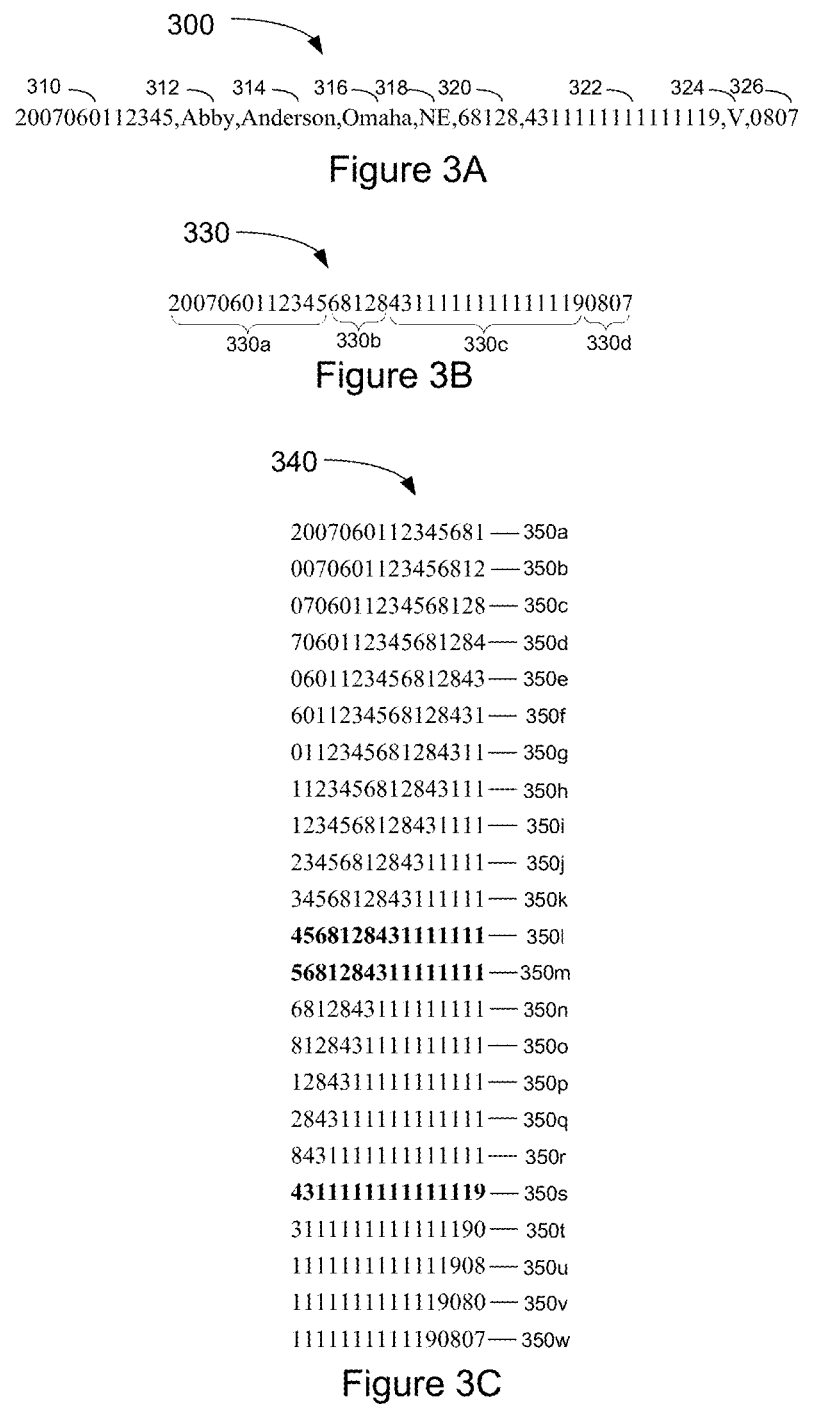

FIG. 3A is a diagrammatic representation of an exemplary transaction record 300 that may be processed to facilitate enhanced financial security in accordance with an embodiment. Record 300 may comprise both fixed and variable length elements maintained in a delimited record, e.g., a comma separated delimited record. In the present example, record 300 comprises a reference number element 310, a first name data element 312, a last name data element 314, a city data element 316, a state data element 318, a zip code data element 320, a credit card number data element 322, a credit card type data element 324, and a credit card expiration data element 326.

In accordance with an embodiment, a temporary record 330 is generated from record 300 by parsing all non-numeric characters from respective data elements 310-326 of record 300 as depicted by the diagrammatic representation of a temporary record in FIG. 3B. Thus, in the present example, temporary record 330 comprises a numeric string comprising numeric characters 330a of reference number element 310, numeric characters 330b of zip code data element 320, numeric characters 330c of credit card number data element 322, and numeric characters 330d of credit card expiration data element 326.

Temporary record 330 comprising only numeric characters may then be sequentially parsed N characters at a time, and the parsed characters may be evaluated to determine if the N characters comprise a potentially valid credit card number. For example, the parsed characters may be evaluated with a LUHN Mod 10 routine to determine if the parsed characters may define a valid credit card number. In accordance with an embodiment, the first N characters are parsed and evaluated with a LUHN Mod 10 routine. In the present example, assume N is set to "16". Accordingly, the first N characters parsed and evaluated comprise the character string "2007060112345681". If the evaluated characters are determined to comprise a valid credit card number, the N characters may be temporarily stored for a scrubbing subroutine. After the first N characters are parsed and evaluated, the parsing routine may shift evaluation of temporary record 330 by one character and parse a subsequent set of N characters (characters "0070601123456812" in the present example) to be evaluated. The routine may continue shifting, parsing, and evaluating N characters until an end of line indicia of temporary record 330 is encountered. Alternatively, the routine may parse N characters from the temporary record, shift a character, parse another N characters and continue in a similar manner until all sequences of N characters have been parsed. The parsed numeric sequences may then be evaluated to determine if any of the parsed sequences comprise a credit card number.

FIG. 3C is a diagrammatic representation of character strings 350a-350w each comprising a sequence of N consecutive characters that may be parsed from temporary record 330 and evaluated in accordance with an embodiment. In an embodiment, each of the N consecutive character strings 350a-350w parsed from temporary record 330 are evaluated with the LUHN Mod 10 algorithm. As is known, the LUHN algorithm comprises a checksum formula used to validate a variety of identification numbers, such as credit card numbers. In general, the LUHN Mod 10 algorithm doubles every other digit of a number beginning from the next to last digit (the next to least significant digit), and any digits that when doubled are greater than 10 have the constituent digits thereof summed. The resulting doubled digits (or sums thereof) are then summed together with the non-doubled digits. If a mod 10 calculation on the resulting sum is zero, then the number is considered valid according to the LUHN Mod 10 algorithm. In the present example, character strings 350l, 350m, and 350s may be validated (as illustratively designated by boldface) according to the LUHN algorithm. Character strings 350l, 350m, and 350s validated according to the LUHN algorithm may additionally be evaluated to determine if the character strings represent valid credit card numbers. For example, character strings validated by the LUHN algorithm may then be evaluated based on known bank identification numbers specified by the first six digits of credit card numbers. In the present example, assume for illustrative purposes each of character strings 350l, 350m, and 350s validate according to a credit card number verification routine. Transaction record 300 may then be searched for each of character stings 350l, 350m and 350s. In the present example, only character string 350s is identified as occurring in transaction record 300. On location of character string 350s in transaction record 300, the data element 322 matching character string 350s may be parsed from transaction record 300 and replaced on a character-by-character basis with a respective white space or other innocuous character, e.g., an character. Accordingly, a scrubbed, or otherwise cleansed, transaction record 360 may then be written over transaction record 300 in transaction record database 174 as depicted in FIG. 3D. Notably, scrubbed transaction record 360 contains comma separator delimited fields 370-386 including data element 382 having only non-identifying characters "*" in place of a credit card number. Thus, scrubbed transaction record 360 may not be exploited for fraudulent use in the event that malicious access of scrubbed transaction record 360 is had.

Figure 4:
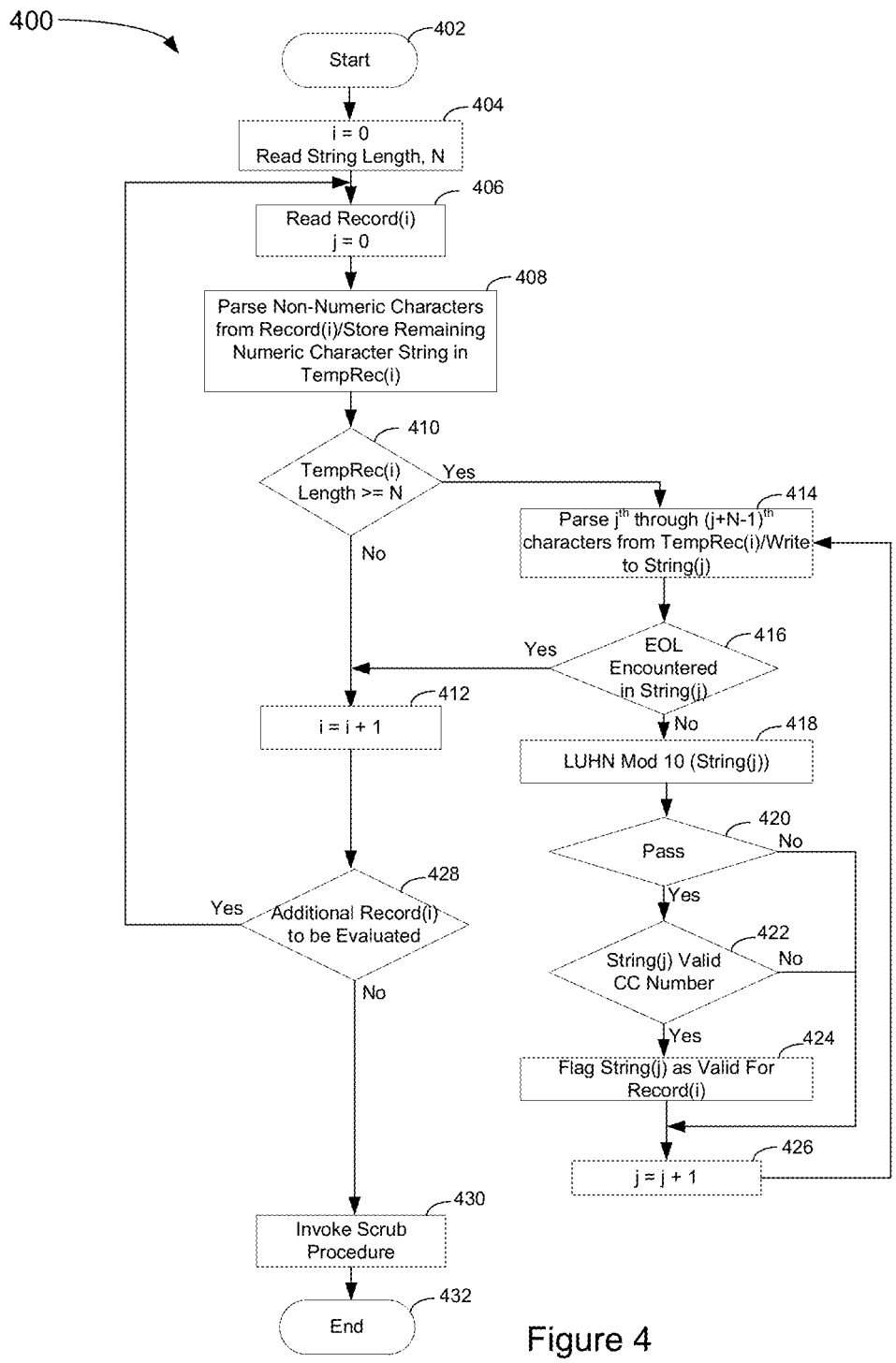
FIG. 4 is a flowchart of a record evaluation routine for identifying numeric strings that may comprise credit card numbers in accordance with an embodiment.

FIG. 4 is a flowchart of a transaction record evaluation routine for identifying numeric strings that may comprise credit card numbers in accordance with an embodiment. The evaluation routine is invoked (step 402). A record index variable, i, may be initialized, and a string length, N, that specifies the length of character strings to be evaluated is read (step 404). A first record(i) may then be read from the records database, and a character index, j, may be initialized to zero (step 406). Non-numeric characters may then be parsed from the record(i), and the remaining numeric characters are stored in a temporary record, TempRec(i) (step 408). An evaluation may then be made to determine if the length of the numeric string of TempRec(i) is greater than or equal to the length, N, of the string length to be evaluated (step 410). In the event that the length of the numeric string is not equal or greater than the length, N, of the string length to be evaluated, the record index variable i may be incremented (step 412).

Returning again to step 410, in the event that the length of the numeric string in TempRec(i) equals or exceeds the string length, N, being evaluated, the evaluation routine may proceed to parse a numeric string comprising the $j^{th}$ through $(j+N-1)^{th}$ characters of the numeric string of TempRec(i) (thereby producing an N length numeric string) and store the parsed numeric string, e.g., in a numeric string variable string(j) (step 414). An evaluation may then be made to determine if an end of line (EOL) was encountered in the parsed numeric string of String(j) (step 416). If an EOL is encountered in String(j), processing may proceed to increment the record index variable, i, according to step 412.

Returning again to step 416, if no EOL is encountered in string(j), a LUHN Mod 10 routine may be invoked on string(j) (step 418), and the results thereof may be evaluated to determine if the numeric string of string(j) passes the LUHN Mod 10 evaluation thereby indicating that the numeric string of string(j) comprises a potentially valid credit card number (step 420). If string(j) does not pass the LUHN Mod 10 evaluation thereby indicating that the numeric string of string(j) does not comprise a valid credit card number, processing may proceed to increment the character index variable j (step 426).

Returning again to step 420, in the event that string(j) passes the LUHN Mod 10 evaluation, the string(j) may then be evaluated to determine if the numeric string thereof comprises a valid credit card number (step 422). For example, the first six digits of string(j) may be evaluated to determine if they specify a valid bank identification number. If string(j) is determined to not comprise a valid credit card number at step 422, the evaluation processing routine may proceed to increment the character index variable j according to step 426.

Returning again to step 422, in the event that string(j) is evaluated as comprising a valid credit card number, string(j)

may be flagged or otherwise designated as valid for record (i), and the character index variable j may then be incremented according to step 426. Upon incrementing the character index variable, j, the evaluation routine may return to parse the $j^{th}$ through $(j+N-1)^{th}$ characters of TempRec(i) and write the parsed characters to string(j) for evaluation according to step 414.

Returning again to step 412, once the current record has been fully evaluated and the record index variable i has been incremented, the evaluation routine may proceed to determine if any additional record(i) remains in the records database for evaluation and potential scrubbing (step 428). If an additional record(i) remains for evaluation, processing may return to read the next record(i) and reinitialize the character index variable, j, according to step 406. When it is determined that no additional records remain for evaluation, a scrub procedure may be invoked (step 430), and the evaluation cycle may end (step 432).

Figure 5:
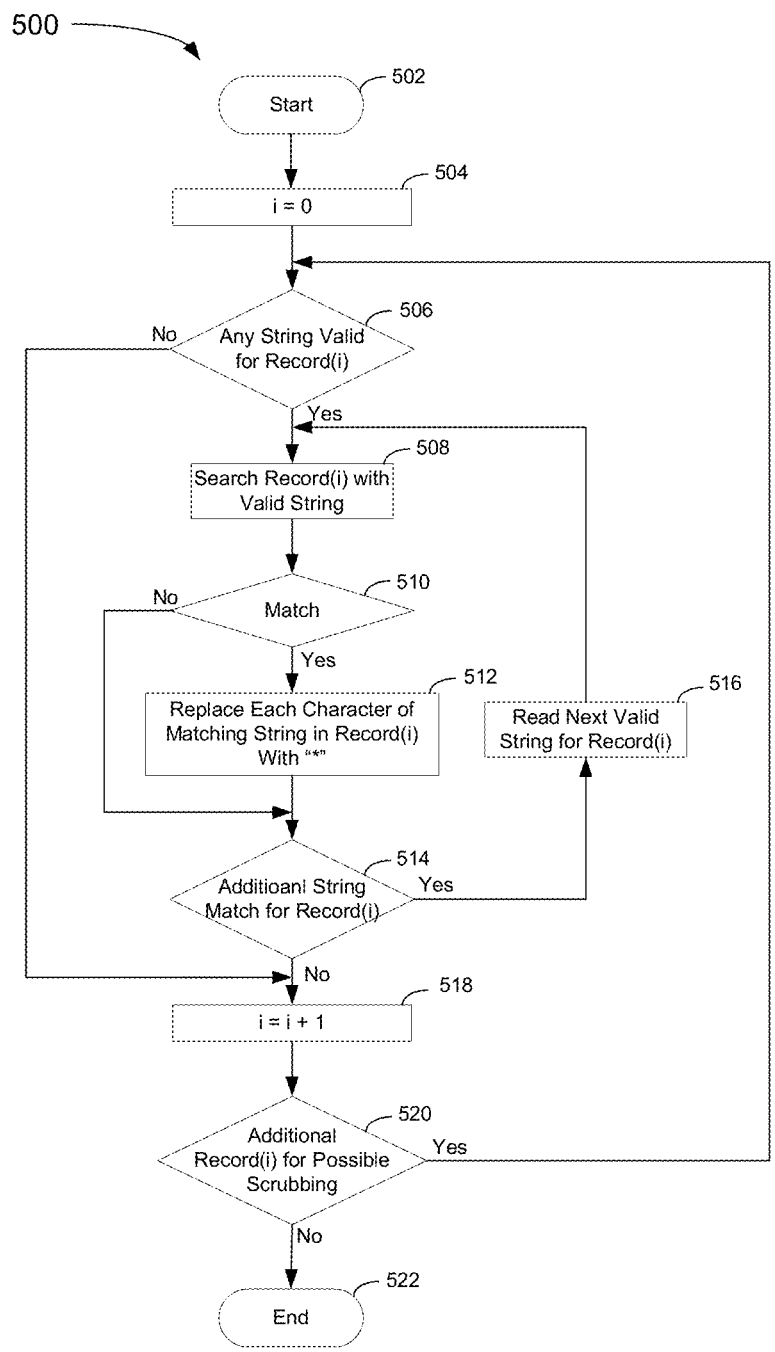
FIG. 5 is a flowchart depicting processing of a scrubbing subroutine implemented in accordance with an embodiment of the invention.

FIG. 5 is a flowchart depicting processing of a scrubbing subroutine implemented in accordance with an embodiment of the invention. The scrubbing routine is invoked (step 502), e.g., according to step 430 of FIG. 4, and a record index variable, i, is initialized (step 504). An evaluation may then be made to determine if any numeric strings have been evaluated as valid for record(i) (step 506). That is, an evaluation is made that determines if any numeric strings have passed the LUHN Mod 10 evaluation and have further been determined to comprise a potentially valid credit card number according to the evaluation procedure described with respect to FIG. 4. If no numeric strings have been evaluated as potentially valid for the current record(i), the scrubbing subroutine may proceed to increment the record index variable, i (step 518).

Returning again to step 506, in the event that a string has been evaluated as potentially valid for the current record(i), record(i) is searched with the potentially valid string (step 508). An evaluation may then be made to determine if a match in record(i) is found with the numeric string (step 510). If no match is found, the scrubbing subroutine may proceed to evaluate whether any additional numeric strings were determined to be valid for record(i) (step 514). If the numeric string was determined to have a match in record(i) at step 510, each character of the matching string in record(i) may then be replaced with a "*" character (step 512) or other white space character, and the scrubbing subroutine may proceed to evaluate whether any additional numeric strings were evaluated as valid for record(i). If any additional numeric strings were evaluated as valid for the current record(i) at step 514, the scrubbing subroutine may proceed to read the next valid numeric string for record(i) and may then search record(i) with the numeric string according to step 508. When it is determined that no additional numeric strings have been evaluated as valid at step 514, the record index variable, i, may be incremented according to step 518, and an evaluation may be made to determine if another record(i) remains for possible scrubbing (step 520). If another record(i) remains for scrubbing, processing may return to 506 to determine if any numeric strings have been evaluated as valid for the current record(i). When it is determined that no additional records remain for possible scrubbing at step 520, the scrubbing subroutine cycle may end (step 522).

As described, mechanisms for removing credit card numbers from financial transaction records are provided. A temporary record containing only numeric characters may be generated from a transaction record by parsing non-numeric characters from the transaction record. Numeric strings are then parsed from the temporary record and evaluated to determine if the parsed numeric strings potentially comprise a credit card number, for example by a LUHN Mod 10 evaluation. Numeric strings that pass the LUHN Mod 10 evaluation may then be further evaluated to determine if the numeric strings comprise valid credit card numbers. The original financial transaction record may then be searched for numeric strings evaluated as a valid credit card numbers. Any string of consecutive characters that matches a validated credit card number may then be replaced with white space characters or other innocuous characters in the transaction record. Advantageously, the scrubbing procedures described herein allow for removal of credit card numbers from both fixed and variable length records maintained in a storage that may additionally have variable record formats.

The flowcharts of FIGS. 4-5 depict process serialization to facilitate an understanding of disclosed embodiments and are not necessarily indicative of the serialization of the operations being performed. In various embodiments, the processing steps described in FIGS. 4-5 may be performed in varying order, and one or more depicted steps may be performed in parallel with other steps. Additionally, execution of some processing steps of FIGS. 4-5 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for processing, by a processor, comprising:
   reading a first transaction record comprising a plurality of characters, including a credit card number, wherein one or more of the plurality of characters comprises alphabetic and numeric characters, the first transaction record comprising either a fixed field record or a delimited record of variable length;
   generating a second record comprising only the numeric characters by parsing the alphabetic characters from the first transaction record, the second record comprising a temporary numeric string having a greater length than a number of characters of a valid credit card;
   sequentially parsing N consecutive numeric characters from the second record with each sequentially parsing step offset by one numeric character from a previous parsing step such that each possible sequence of N consecutive numeric characters are parsed from the second record until an end-of-line character is identified in the second record;
   evaluating each of a plurality of sequences of N consecutive numeric characters to determine whether the respective sequence comprises a valid credit card number by evaluating each of the plurality of sequences of N consecutive numeric characters with a LUHN Mod 10 evaluation;
   when any one of the sequences of N consecutive numeric characters does not pass the LUHN Mod 10 evaluation, then determining that particular sequence of N consecutive numeric characters does not comprise a valid credit card number;
   responsive to identifying the N consecutive numeric characters do not comprise a valid credit card number N, incrementing a character index variable;
   searching the first transaction record for any sequence evaluated as the valid credit card number;
   responsive to searching, determining a first sequence evaluated as a valid credit card number is included in the first transaction record; and
   replacing each character of the first sequence in the first transaction record with a respective non-numeric and non-identifying character to generate a scrubbed transaction record.

2. The method of claim 1, comprising incrementing the character index variable responsive to determining the valid credit card number.

3. The method of claim 1, wherein replacing each character comprises replacing each character with an * character.

4. The method of claim 1, comprising generating a temporary record containing only numeric characters by parsing non-numeric characters from the first transaction record, wherein the temporary record comprises at least a numeric credit card number.

5. The method of claim 1, further comprising, responsive to determining a first sequence of N consecutive numeric characters is valid according to the LUHN Mod 10 evaluation, evaluating the first sequence of N consecutive numeric characters to determine the first sequence comprises a valid credit card number.

6. The method of claim 1, comprising generating a scrubbed transaction record from the first transaction record based on the sequence evaluated as the valid credit card number, wherein the scrubbed transaction record comprises each of plurality of characters with the credit card number being scrubbed.

7. A computer-readable medium having computer-executable instructions for execution by a processing system, the computer-executable instructions for when executed, cause the processing system to:
   read a first transaction record comprising a plurality of characters, including a credit card number, wherein one or more of the plurality of characters comprises alphabetic and numeric characters, the first transaction record comprising either a fixed field record or a delimited record of variable length;
   generate a second record comprising only the numeric characters by parsing the alphabetic characters from the first transaction record, the second record comprising a temporary numeric string having a greater length than a number of characters of a valid credit card;
   sequentially parse N consecutive numeric characters from the second record with each sequentially parsing step offset by one numeric character from a previous parsing step such that each possible sequence of N consecutive numeric characters are parsed from the second record until an end-of-line character is identified in the second record;
   evaluate each of a plurality of sequences of N consecutive numeric characters to determine whether the respective sequence comprises a valid credit card number by evaluating each of the plurality of sequences of N consecutive numeric characters with a LUHN Mod 10 evaluation;
   when any one of the sequences of N consecutive numeric characters does not pass the LUHN Mod 10 evaluation, then determine that particular sequence of N consecutive numeric characters does not comprise a valid credit card number;
   responsive to identifying the N consecutive numeric characters do not comprise a valid credit card number N, increment a character index variable;
   search the first transaction record for any sequence evaluated as a valid credit card number;
   responsive to searching, determine a first sequence evaluated as a valid credit card number is included in the first transaction record; and
   replace each character of the first sequence in the first transaction record with a respective non-numeric and non-identifying character to generate a scrubbed transaction record.

8. The computer-readable medium of claim 7, comprising instructions for incrementing the character index variable responsive to determining the valid credit card number.

9. The computer-readable medium of claim 7, wherein the instructions to replace each character comprise instructions to replace each character with an * character.

10. The computer-readable medium of claim 7, comprising instructions to generate a temporary record containing only numeric characters by parsing non-numeric characters from the first transaction record, wherein the temporary record comprises at least a numeric credit card number.

11. The computer-readable medium of claim 7, further comprising, responsive to a determining a first sequence of N consecutive numeric characters is valid according to the LUHN Mod 10 evaluation, instructions to evaluate the first sequence of N consecutive numeric characters to determine the first sequence comprises a valid credit card number.

12. The computer-readable medium of claim 7, comprising instructions to generate a scrubbed transaction record from the first transaction record based on the sequence evaluated as the valid credit card number, wherein the scrubbed transaction record comprises each of plurality of characters with the credit card number being scrubbed.

13. A system, comprising:
a processing unit; and
a memory communicatively coupled with the processing unit and storing computer-executable instructions for execution by the processing unit, the computer-executable instructions specifying logic that, when executed, causes the processing unit to:
read a first transaction record comprising a plurality of characters, including a credit card number, wherein one or more of the plurality of characters comprises alphabetic and numeric characters, the first transaction record comprising either a fixed field record or a delimited record of variable length;
generate a second record comprising only the numeric characters by parsing the alphabetic characters from the first transaction record, the second record comprising a temporary numeric string having a greater length than a number of characters of a valid credit card;
sequentially parse N consecutive numeric characters from the second record with each sequentially parsing step offset by one numeric character from a previous parsing step such that each possible sequence of N consecutive numeric characters are parsed from the second record until an end-of-line character is identified in the second record;
evaluate each of a plurality of sequences of N consecutive numeric characters to determine whether the respective sequence comprises a valid credit card number by evaluating each of the plurality of sequences of N consecutive numeric characters with a LUHN Mod 10 evaluation;
when any one of the sequences of N consecutive numeric characters does not pass the LUHN Mod 10 evaluation, then determine that particular sequence of N consecutive numeric characters does not comprise a valid credit card number;
responsive to identifying the N consecutive numeric characters do not comprise a valid credit card number N, increment a character index variable; and
search the first transaction record for any sequence evaluated as a valid credit card number;
responsive to searching, determine a first sequence evaluated as a valid credit card number is included in the first transaction record; and
replace each character of the first sequence in the first transaction record with a respective non-numeric and non-identifying character to generate a scrubbed transaction record.

14. The system of claim 13, further comprising a storage device configured to maintain a database including the first transaction record.

15. The system of claim 13, wherein the computer-executable instructions specify logic to increment the character index variable responsive to determining the valid credit card number.

16. The system of claim 13, wherein the processing unit is configured to replace each character with an * character.

17. The system of claim 13, wherein the computer-executable instructions specify logic to generate a temporary record containing only numeric characters by parsing non-numeric characters from the first transaction record, wherein the temporary record comprises at least a numeric credit card number.

18. The system of claim 13, wherein the processing unit, responsive to determining a first sequence of N consecutive numeric characters is valid according to the LUHN Mod 10 evaluation, is configured to evaluate the first sequence of N consecutive numeric characters to determine the first sequence comprises a valid credit card number.

* * * * *